United States Patent
Haley et al.

(10) Patent No.: US 7,972,067 B2
(45) Date of Patent: Jul. 5, 2011

(54) FIBER OPTIC CONNECTOR ASSEMBLY

(75) Inventors: Edmund J. Haley, Dillsburg, PA (US); David Robert Baechtle, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 106 days.

(21) Appl. No.: 12/561,967

(22) Filed: Sep. 17, 2009

(65) Prior Publication Data

US 2010/0329611 A1     Dec. 30, 2010

Related U.S. Application Data

(63) Continuation-in-part of application No. 12/495,108, filed on Jun. 30, 2009, now Pat. No. 7,794,155.

(51) Int. Cl.
*G02B 6/36* (2006.01)
*G02B 6/38* (2006.01)

(52) U.S. Cl. ............... 385/78; 385/58; 385/76; 385/77; 385/53; 385/56; 385/139

(58) Field of Classification Search .................. 385/53, 385/56, 58, 59, 60, 66, 62, 70, 71, 72, 76, 385/77, 88, 89, 90, 92, 94, 139, 78
See application file for complete search history.

(56) References Cited

U.S. PATENT DOCUMENTS

| | | | | |
|---|---|---|---|---|
| 5,073,046 A | * | 12/1991 | Edwards et al. | 385/90 |
| 5,386,487 A | * | 1/1995 | Briggs et al. | 385/59 |
| 6,318,903 B1 | * | 11/2001 | Andrews et al. | 385/77 |
| 6,682,230 B1 | * | 1/2004 | Demangone et al. | 385/88 |
| 7,325,980 B2 | | 2/2008 | Pepe | 385/86 |
| 7,338,214 B1 | | 3/2008 | Gurreri et al. | 385/55 |
| 7,794,155 B1 | * | 9/2010 | Haley et al. | 385/78 |
| 2003/0077045 A1 | * | 4/2003 | Fleenor et al. | 385/78 |
| 2010/0329611 A1 | * | 12/2010 | Haley et al. | 385/58 |

* cited by examiner

*Primary Examiner* — Brian M Healy

(57) ABSTRACT

A fiber optic connector assembly includes a coupling interface component, a connector housing, and an optical fiber connector. The coupling interface component extends along a center axis from a back end to a coupling end and includes an interior chamber. The connector housing is disposed within the interior chamber of the coupling interface component. The optical fiber connector is joined to an optical fiber and is interconnected with the connector housing. The optical fiber connector is configured to optically couple the optical fiber with a mating connector. The coupling interface component engages the connector housing and the mating connector and prevents movement of the connector housing relative to the coupling interface component and the mating connector.

20 Claims, 11 Drawing Sheets

FIBER OPTIC CONNECTOR ASSEMBLY

CROSS-REFERENCE TO RELATED APPLICATIONS

This application is a continuation-in-part of U.S. patent application Ser. No. 12/495,108, filed Jun. 30, 2009, and entitled "Fiber Optic Connector System" (the "'108 Application"). The entire disclosure of the '108 is incorporated by reference herein in its entirety.

BACKGROUND OF THE INVENTION

The subject matter herein relates generally to electrical connectors and, more particularly, to connectors that optically communicate signals using optical fibers.

Some known optical connectors include optical fibers that are provided in a plug connector. The optical fibers extend to mating ends that are held by a plug end of the plug connector. The plug connector mates with a receptacle connector to permit optical communication of signals therebetween using the optical fibers. The receptacle connector may include a transceiver that mates with the ends of the optical fibers to permit the plug connector and receptacle connector to communicate with one another.

The plug connectors may include coupling components, such as threaded nuts, bayonet-style connectors, or push/pull connectors, that engage the receptacle connectors to secure the plug and receptacle connectors with one another. The engagement between the plug connector and the receptacle connector advances the ends of the optical fibers in the plug connector through an opening along an upper end of the receptacle connector and into the receptacle connector toward the transceiver. The plug connector may advance the ends of the optical fibers a fixed distance. In some connectors, the engagement between the plug and receptacle connectors mates the optical fibers with the transceiver by abutting the ends of the fiber optic cables against the transceiver. But, due to variances in the manufacture or assembly of the receptacle connectors and/or devices, the location of the transceiver in the receptacle connector may vary.

If the transceiver is located too far toward the upper end of the receptacle connector, the engagement between the plug connector and the receptacle connector may advance the ends of the optical fibers too far. For example, the ends of the optical fibers may be overdriven and forced up against the transceiver by an amount sufficient to damage the ends of the optical fibers. While some known receptacle connectors have some tolerance to account for variability of the location of the transceiver relative to the receptacle connector, the tolerance in known connectors may be too small to avoid overdriving the optical fibers. The overdriving of and damage to the optical fibers may impact the integrity of the signals communicated between the plug and receptacle connectors.

In some optical connectors, pulling on the cable rear of the optical connector may decouple the plug connector from the receptacle connector. For example, applying a rearward force on the cable of the plug connector in directions away from the receptacle connector may pull the ends of the optical fibers away from the receptacle connector. Additionally, if the rearward force is sufficiently large, the cable may be pulled out of the plug connector and render the plug connector inoperable. Some known plug connectors include an internal plug housing that receives the cable and holds the optical fibers and an external coupling nut or ferrule that mates with the receptacle connector to secure the plug connector with the receptacle connector. The plug housing is located within the coupling nut. A rear end of the coupling nut may include an opening large enough to receive the cable but small enough to prevent rearward removal of the plug connector from the coupling nut. As a result, the plug housing engages the rear end of the coupling nut when a rearward force is applied to the cable. But, the engagement or interference between the rear end of the coupling nut and the connector housing may be insufficient to prevent separation between ends of the optical fibers that are held by the plug housing and the receptacle connector. For example, some rearward forces applied to the cables are sufficiently large to cause the plug housing to retreat away from the receptacle connector and decouple the optical fibers from the receptacle connector.

Thus, a need exists for optical fiber connectors that provide increased tolerances in the mating of the connectors to avoid damaging the fiber optic cables in the connectors. A need also exists for optical fiber connectors that prevent decoupling of the optical fibers from a connector that mates with the optical fiber connectors when a rearward force is applied to the cable that holds the optical fibers.

BRIEF DESCRIPTION OF THE INVENTION

In one embodiment, a fiber optic connector assembly is provided. The connector assembly includes a coupling interface component, a connector housing, and an optical fiber connector. The coupling interface component extends along a center axis from a back end to a coupling end and includes an interior chamber. The coupling end is configured to engage a mating connector. The connector housing is disposed within the interior chamber of the coupling interface component. The connector housing extends along the center axis from a cable receiving end to a mating end with a passage extending therethrough. The cable receiving end is configured to receive a cable having an optical fiber. The mating end is configured to mate with the mating connector. The optical fiber connector is joined to the optical fiber and is interconnected with the connector housing. The optical fiber connector is configured to optically couple the optical fiber with the mating connector. The coupling interface component engages the connector housing and the mating connector and prevents movement of the connector housing relative to the coupling interface component and the mating connector.

In another embodiment, another fiber optic connector assembly is provided. The connector assembly includes a coupling interface component, a connector housing, a cable, and an optical fiber connector. The coupling interface component extends along a center axis between a back end to a coupling end and includes an interior chamber. The coupling end is configured to engage a mating connector. The connector housing is disposed within the interior chamber of the coupling interface component and extends along the center axis from a cable receiving end to a mating end. The mating end is configured to mate with the mating connector. The cable is secured to the cable receiving end of the connector housing and includes an optical fiber. The optical fiber connector is joined with the optical fiber and is configured to mate with the mating connector to optically couple the optical fiber with the mating connector. The coupling interface component engages the connector housing and the mating connector and prevents movement of the connector housing along the center axis.

DETAILED DESCRIPTION OF THE INVENTION

Figure 1:
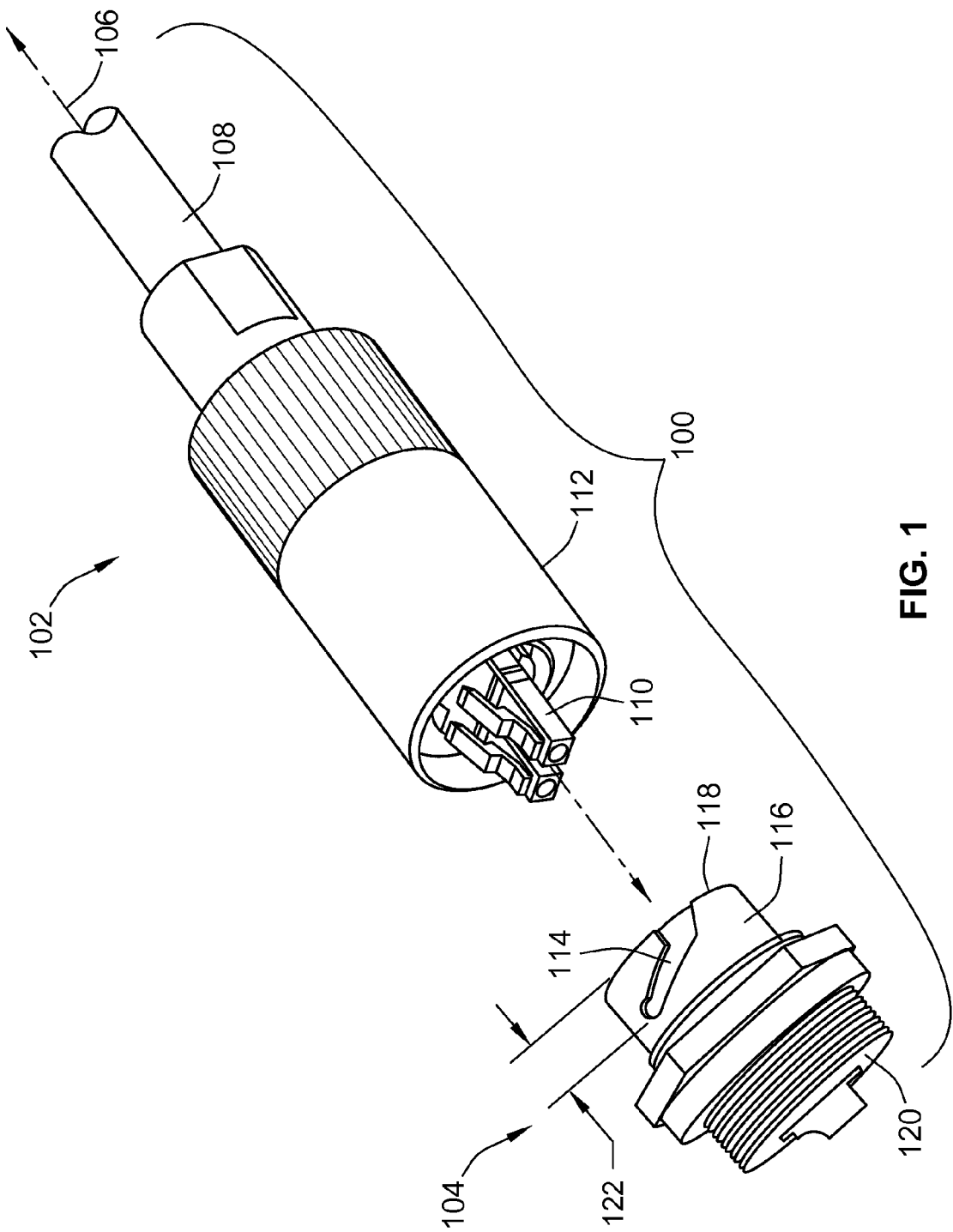
FIG. 1 is a perspective view of a fiber optic connector system in accordance with one embodiment.

FIG. 1 is a perspective view of a fiber optic connector system 100 in accordance with one embodiment. The connector system 100 includes a fiber optic connector assembly 102 and a mating connector assembly 104. In the illustrated embodiment, the connector assemblies 102, 104 are small form factor LC connectors. The scope of the disclosed embodiments is not, however, limited to LC connectors. One or more embodiments may encompass connectors other than LC connectors and the illustration and description herein of LC connectors should not be construed as a limitation on the scope of all embodiments. Additionally, while the fiber optic connector assembly 102 is shown and described in terms of a plug connector and the mating connector assembly 104 is shown and described in terms of a receptacle connector, alternatively the fiber optic connector assembly 102 may be a receptacle connector that receives the mating connector assembly 104.

The fiber optic connector assembly 102 is elongated and oriented along a center axis 106. The fiber optic connector assembly 102 includes a cable 108 that houses one or more elongated optical fibers 200 (shown in FIG. 2). The cable 108 and optical fibers 200 extend along the center axis 106. While the center axis 106 is shown as a generally straight line in FIG. 1, the center axis 106 may include one or more bends, undulations, and other variances from a straight line. The optical fibers 200 are coupled with one or more optical fiber connectors 110. In the illustrated embodiment, the fiber optic connector assembly 102 includes two optical fiber connectors 110, although a different number, shape, and/or arrangement of optical fiber connectors 110 may be provided. The optical fiber connectors 110 may be received in the mating connector assembly 104 to optically couple the connector assemblies 102, 104. The optical fiber connectors 110 include outer ends 202 (shown in FIG. 2) of the optical fibers 200. The optical fiber connectors 110 are received in the mating connector assembly 104 to place the outer ends 202 of the optical fibers 200 in a mated relationship with an optical communication device 500 (shown in FIG. 5), such as optical communication device 500a transceiver or another optical connector, that is disposed in the mating connector assembly 104. For example, the optical fiber connectors 110 may directly abut the outer ends 202 of the optical fibers 200 against a mating surface 508 (shown in FIG. 5) of the optical communication device 500. Signals may be optically communicated between the optical fibers 200 and the mating connector assembly 104 once the outer ends 202 of the optical fibers 200 are engaged with the optical communication device 500.

The fiber optic connector assembly 102 includes a coupling interface component 112 that extends around the center axis 106 along a portion of the length of the fiber optic connector assembly 102. The coupling interface component 112 engages the mating connector assembly 104 to secure the fiber optic connector assembly 102 and the mating connector assembly 104 together in a mated engagement or relationship. In the illustrated embodiment, the coupling interface component 112 is a bayonet-style coupling nut. For example, the coupling interface component 112 may include one or more inwardly extending protrusions (not shown) that engage recesses 114 of the mating connector assembly 104 to provide a bayonet-style connection between the connector assemblies 102, 104. Alternatively, the coupling interface component 112 may have an internal threaded surface that engages an external threaded surface of the mating connector assembly 104 to secure the connector assemblies 102, 104 together. In another embodiment, the coupling interface component 112 may include a push/pull connector that engages and disengages the mating connector assembly 104 by pushing and/or pulling the coupling interface component 112 in directions along the center axis 106. The engagement between the coupling interface component 112 and the mating connector assembly 104 may advance the optical fiber connectors 110 toward the optical communication device 500 (shown in FIG. 5) in the mating connector assembly 104 along the center axis 106 by a coupling distance 122. For example, the outer ends 202 (shown in FIG. 2) of the optical fibers 200 (shown in FIG. 2) may be moved along the center axis 106 by the coupling distance 122.

Figure 5:
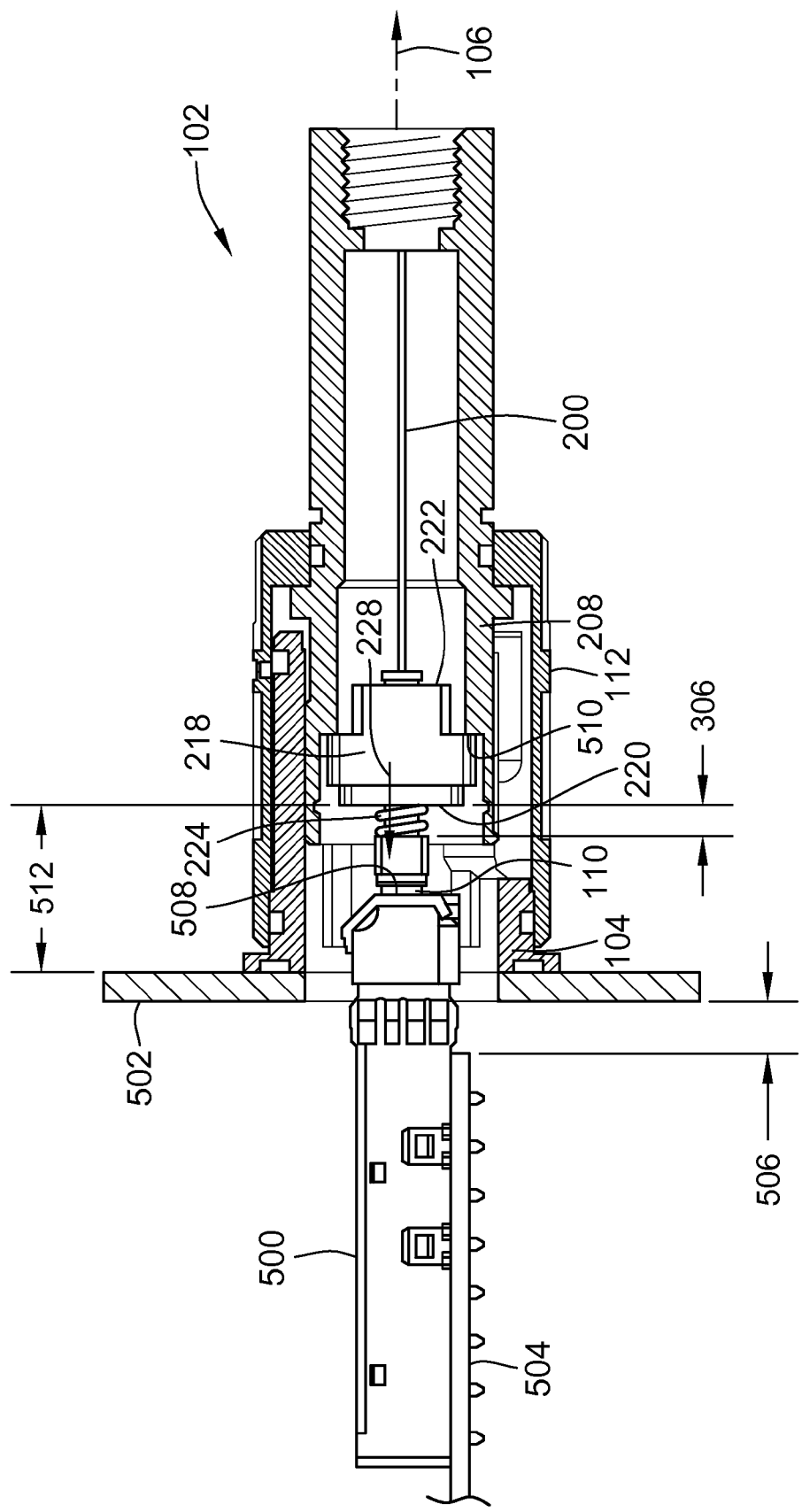
FIG. 5 is a partial cross-sectional view of the fiber optic connector assembly and a mating connector assembly shown in FIG. 1 in accordance with one embodiment.

The mating connector assembly 104 includes an outer housing 116 that partially encloses the optical communication device 500 (shown in FIG. 5). For example, the outer housing 116 may circumferentially surround a perimeter of the optical communication device 500 while providing access to the optical communication device 500 on one or more ends 118, 120 of the outer housing 116. In one embodiment, the mating connector assembly 104 may be mounted to a panel 502 (shown in FIG. 5) or a substrate (not shown), such as a circuit board. For example, the mating connector assembly 104 may be joined to the panel 502 (shown in FIG. 5) that forms part of an exterior surface of a device (not shown) and protrude outside of the device to provide access to the end 118 of the mating connector assembly 104. The fiber optic connector assembly 102 may mate with the mating connector assembly 104 from outside of the device. Alternatively, the mating connector assembly 104 may be embodied in an optical connector assembly that mates with the fiber optic connector assembly 102.

As described below, the optical fiber connectors 110 float along the center axis 106 to mate the optical fiber connectors 110 with the optical communication device 500 (shown in FIG. 5) of the mating connector assembly 104. For example, the optical fiber connectors 110 may axially move along the center axis 106 relative to the mating surface 508 (shown in FIG. 5) of the optical communication device 500 when the fiber optic connector assembly 102 mates with the mating connector assembly 104. In one embodiment, the optical fiber connectors 110 may axially float in order to position the outer ends 202 (shown in FIG. 2) of the optical fibers 200 (shown in FIG. 2) in an abutted relationship against the mating surface 508 without leaving a significant air gap between the outer ends 202 and the mating surface 508 and without overdriving or compressing the optical fibers 200 against the mating surface 508 to the point at which the optical fibers 200 become damaged.

Figure 2:
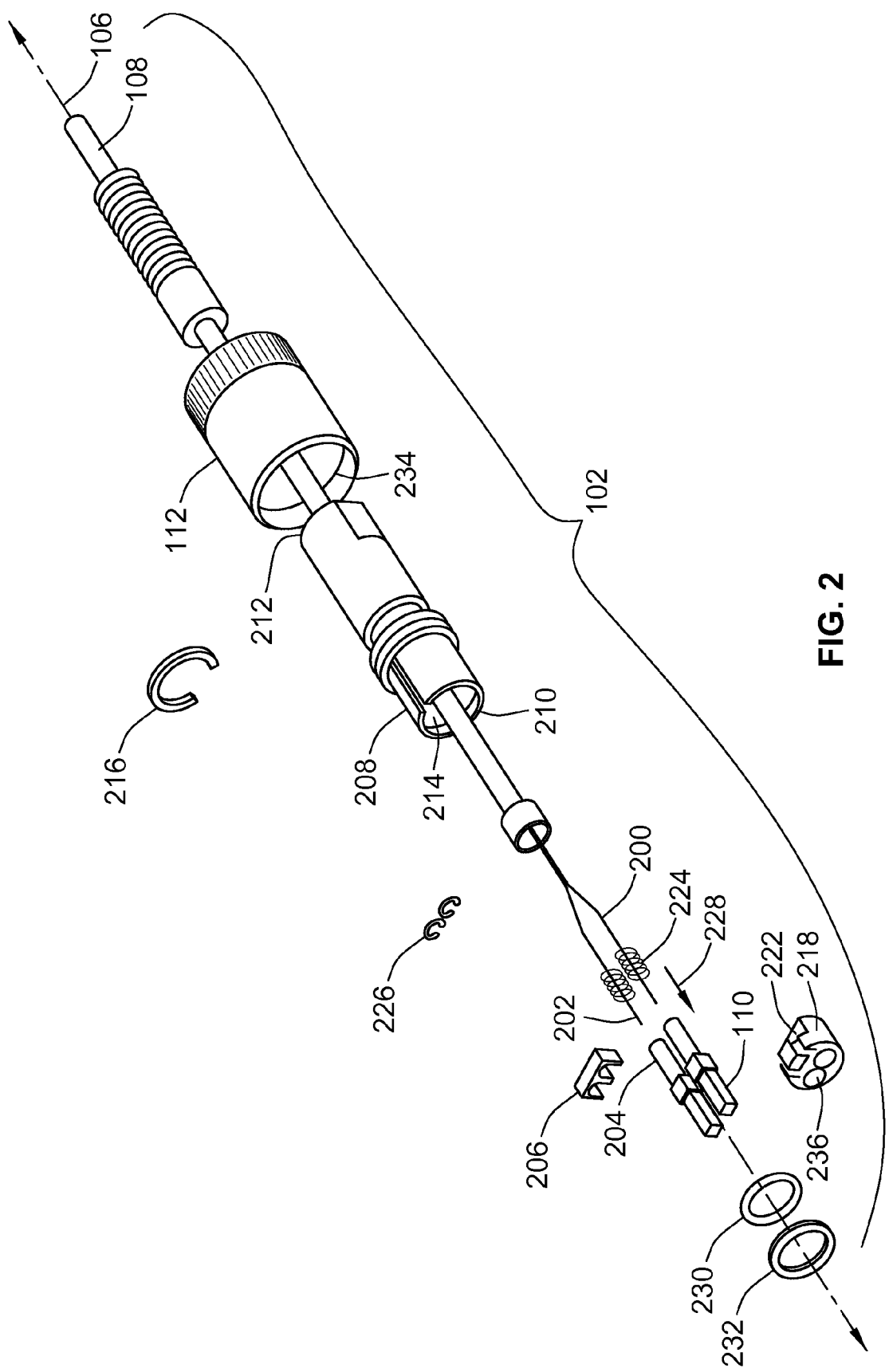
FIG. 2 is an exploded view of a fiber optic connector assembly shown in FIG. 1 in accordance with one embodiment.

FIG. 2 is an exploded view of the fiber optic connector assembly 102 in accordance with one embodiment. The optical fibers 200 extend through the cable 108 to the outer ends 202. Each of the outer ends 202 is disposed within a different optical fiber connector 110. Alternatively, more than one optical fiber 200 may extend to outer ends 202 located in a single optical fiber connector 110. The optical fiber connectors 110 include posts 204 that rearwardly extend from the optical fiber connectors 110 along the center axis 106. For example, the posts 204 may extend in directions that are approximately parallel to the center axis 106. The posts 204 may include a longitudinal passage (not shown) extending through the length of the posts 204. The optical fibers 200 may pass through the posts 204 to the optical fiber connectors 110. A duplex clip 206 is coupled to the optical fiber connectors 110 to secure the optical fiber connectors 110 together. For example, the duplex clip 206 may be snap fit onto the optical fiber connectors 110 or the posts 204 to maintain the optical fiber connectors 110 in predetermined positions with respect to one another.

The fiber optic connector assembly 102 includes a connector housing 208 that extends along the center axis 106 from a mating end 210 to a cable receiving end 212. The mating end 210 is received in the mating connector assembly 104 (shown in FIG. 1) when the fiber optic connector assembly 102 and mating connector assembly 104 mate with one another. The connector housing 208 includes a passage 214 that extends through the connector housing 208 between the mating end 210 and the cable receiving end 212. The cable 108 extends through the passage 214 from the cable receiving end 212 to the mating end 210. The connector housing 208 is at least partially disposed within the coupling interface component 112. For example, a forward portion of the connector housing 208 at the mating end 210 may extend forward of the coupling interface component 112 to permit an operator to insert the connector housing 208 into the mating connector assembly 104.

A retaining clip 216 may be joined to the connector housing 208. The retaining clip 216 may be engaged by the coupling interface component 112 when the coupling interface component 112 mates with the mating connector assembly 104. The coupling interface component 112 may compress the mating connector assembly 104 against the connector housing 208. For example, the coupling interface component 112 may force the connector housing 208 toward the mating connector assembly 104 by the distance 122 (shown in FIG. 1) along the center axis 106 when the coupling interface component 112 engages the mating connector assembly 104. The movement of the connector housing 208 toward the mating connector assembly 104 also may move the optical fiber connectors 110 toward the optical communication device 500 (shown in FIG. 5) located in the mating connector assembly 104 by the coupling distance 122.

The fiber optic connector assembly 102 includes a connector base 218 that is coupled with the connector housing 208. The connector base 218 extends from a forward end 220 to a rearward end 222 along the center axis 106. In the illustrated embodiment, the connector base 218 includes two channels 236 that extend through the connector base 218 along the center axis 106 from the forward end 220 to the rearward end 222. For example, the channels 236 may be disposed approximately parallel to the center axis 106. Alternatively, a different number of channels 236 may be provided. The posts 204 of the optical fiber connectors 110 are received in the channels 236 to slidably join the optical fiber connectors 110 to the connector base 218. The posts 204 slide within the connector base 218 to permit the optical fiber connectors 110 to axially move along the center axis 106 relative to the connector base 218. Retaining clips 226 may be placed on the posts 204 to prevent the posts 204 from forwardly sliding out of the connector base 218. For example, the retaining clips 226 may engage the rearward end 222 of the connector base 218 to prevent the posts 204 from being removed from the connector base 218 through the forward end 220 of the connector base 218.

The posts 204 may be disposed within corresponding springs 224 in the connector base 218. The posts 204 may be loaded into the springs 224 such that the springs 224 tortuously surround the exterior surfaces of the posts 204. The springs 224 extend between the optical fiber connectors 110 and the connector base 218. For example, the springs 224 may extend between the optical fiber connectors 110 and an internal ledge 400 (shown in FIG. 4) of the connector base 218. The springs 224 may impart a restoring force on the optical fiber connectors 110 along the center axis 106 in a mating direction 228 when the optical fiber connectors 110 engage the optical communication device 500 (shown in FIG. 5) of the mating connector assembly 104 (shown in FIG. 1). For example, if the engagement between the fiber optic connector assembly 102 and the mating connector assembly 104 overdrives the outer ends 202 of the optical fibers 200 toward the optical communication device 500, the springs 224 may be compressed between the optical fiber connectors 110 and the connector base 218 and the posts 204 may slide within the connector base 218 to permit the optical fiber connectors 110 to retreat away from the optical communication device 500. The springs 224 impart the restoring force on the optical fiber connectors 110 in the mating direction 228 to maintain engagement between the outer ends 202 of the optical fibers 200 and the optical communication device 500.

In one embodiment, the optical fiber connectors 110 may include internal springs (not shown) that are coupled with the optical fibers 200 within the optical fiber connectors 110. The internal springs may provide a partial restoring force in a manner similar to the springs 224. For example, the internal springs may impart a restoring force in the mating direction 228 when the ends 202 of the optical fibers 200 are compressed against the optical communication device 500. The restoring force provided by the internal springs is less than the restoring force provided by the springs 224 in one embodiment. For example, the internal springs may have lower spring constants than the springs 224 and may fully compress before the springs 224 compress. Alternatively, the internal springs may have a greater spring constant than the springs 224. In another embodiment, the spring constants of the internal springs and the springs 224 are approximately the same.

A washer 230 may be placed on a forward perimeter of the forward end 220 of the connector base 218. After the connector base 218 is loaded into the connector housing 208, a retaining ring 232 may be placed in the connector housing 208. For example, the retaining ring 232 may be disposed along an inner groove 234 of the connector housing 208. The retaining ring 232 engages the washer 230 to secure the connector base 218 within the connector housing 208. For example, the retaining ring 232 may decrease the effective inside diameter of the connector housing 208 and engage the washer 230 or the connector base 218 to prevent the connector base 218 from being removed from the connector housing 208 through the mating end 210 of the connector housing 208.

Figure 3:
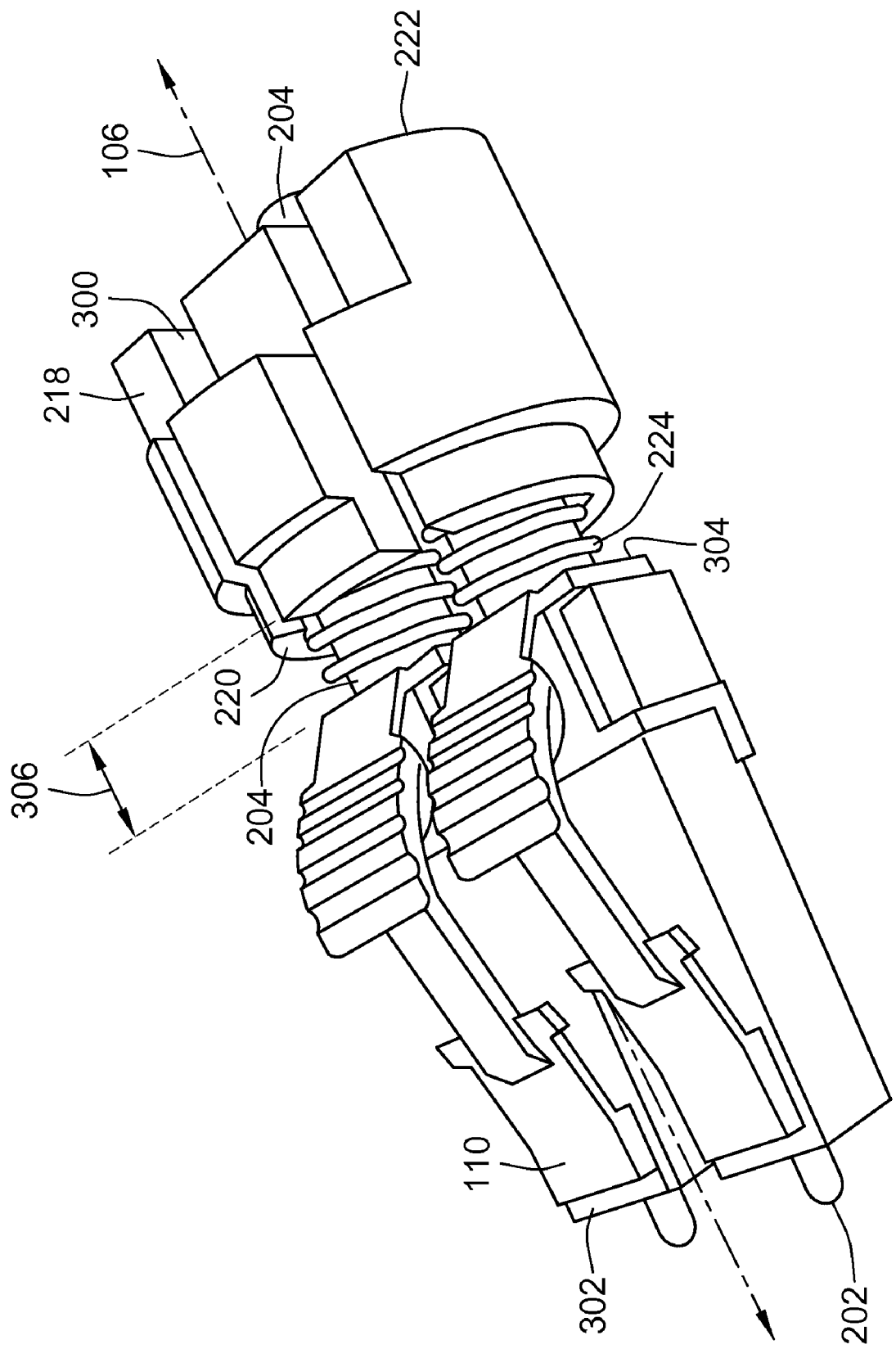
FIG. 3 is a perspective view of the connector base shown in FIG. 2 in accordance with one embodiment.

FIG. 3 is a perspective view of the connector base 218 in accordance with one embodiment. As shown in FIG. 3, both the posts 204 and the springs 224 are disposed in the channels 236 of the connector base 218. The connector base 218 may include slots 300 that extend from the forward end 220 to the rearward end 222. The slots 300 provide access to the channels 236 (shown in FIG. 2) from the exterior surface of the connector base 218. For example, the slots 300 may be openings into the channels 236 through which the optical fibers 200 (shown in FIG. 2) may be individually loaded. The optical fibers 200 may be laid down into the channels 236 through the slots 300 prior to inserting the optical fibers 200 through the posts 204 and into the optical fiber connectors 110.

The optical fiber connectors 110 have a mating end 302 and an opposite rearward end 304. The mating end 302 may engage the mating surface 508 (shown in FIG. 5) of the optical communication device 500 (shown in FIG. 5) to couple the outer ends 202 of the optical fibers 200 (shown in FIG. 2) with the optical communication device 500. The rearward ends 304 of the optical fiber connectors 110 are separated from the forward end 220 of the connector base 218 by a floating distance 306. The floating distance 306 represents the distance along the center axis 106 that the optical fiber connectors 110 may axially move along the center axis 106 relative to one or more other components of the fiber optic connector assembly 102 (shown in FIG. 1). For example, the floating distance 306 may be the distance that the optical fiber connectors 110 may be moved toward the connector base 218 and the distance that the springs 224 may be compressed when the optical fiber connectors 110 mate with the optical communication device 500.

Figure 4:
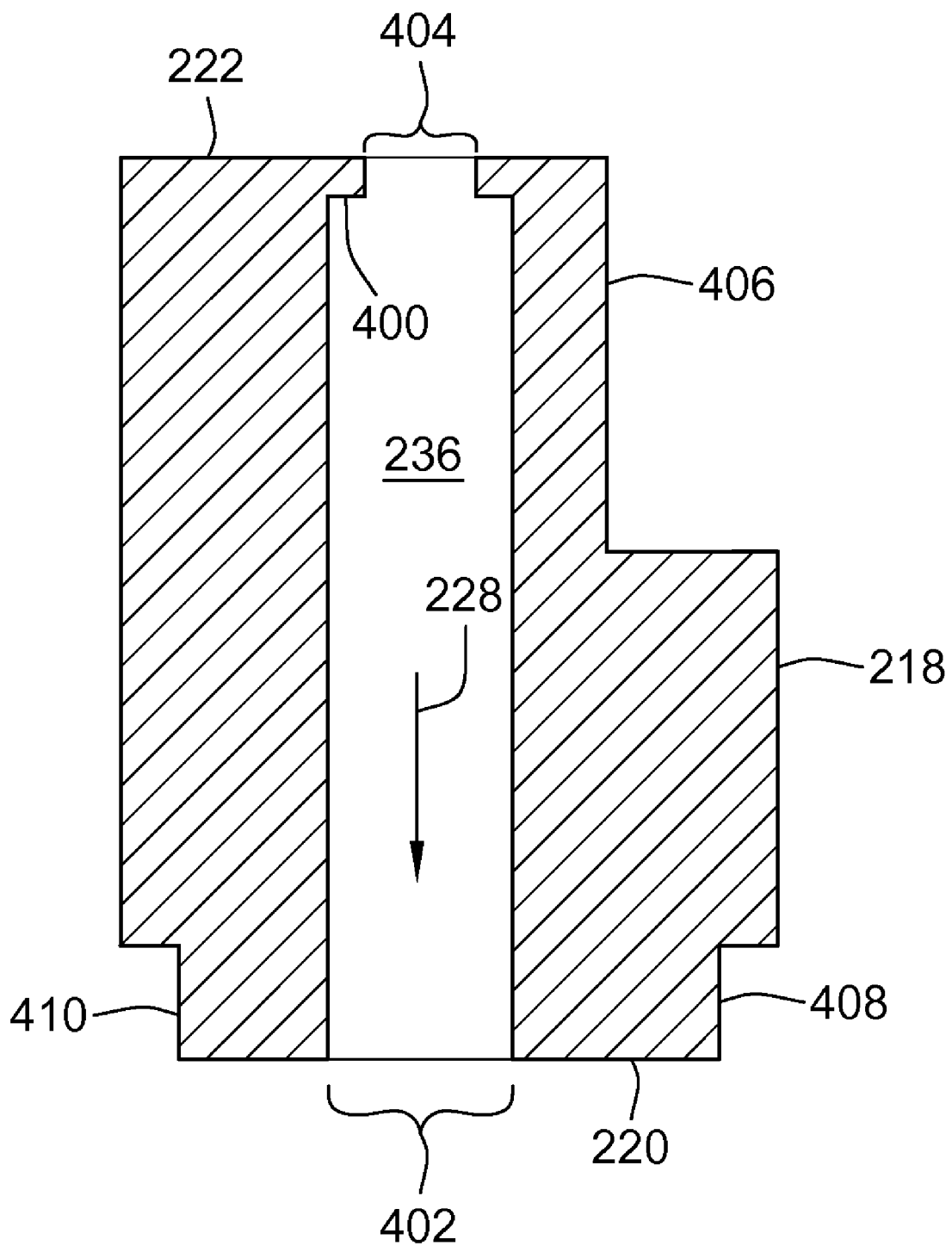
FIG. 4 is a cross-sectional view of the connector base in accordance with one embodiment.

FIG. 4 is a cross-sectional view of the connector base 218 in accordance with one embodiment. The connector base 218 includes internal ledges 400 that extend into the channels 236. Each channel 236 may include the ledges 400. The ledges 400 reduce the inside diameter of the channels 236. In one embodiment, the posts 204 (shown in FIG. 2) are sized to fit through the channels 236 and between the ledges 400. For example, the posts 204 may have a sufficiently small width or outside diameter that the posts 204 can move through an opening 402 of the channel 236 at the forward end 220 and through a smaller opening 404 of the channel 236 at the rearward end 222. Conversely, the springs 224 may be sized to fit into the channels 236 but not between the ledges 400. For example, the springs 224 may have a sufficient width or outside diameter that the springs 224 can be inserted into the opening 402 at the forward end 220 but not through the opening 404 at the rearward end 222. Instead, the springs 224 engage the ledges 400 and are prevented from exiting the channels 236 through the opening 404 by the ledges 400.

The springs 224 are compressed between the optical fiber connectors 110 (shown in FIG. 1) and the ledges 400 when the optical fiber connectors 110 are moved toward the connector base 218. As described above, the optical fiber connectors 110 may be pushed backward toward the connector base 218 when the fiber optic connector assembly 102 (shown in FIG. 1) mates with the mating connector assembly 104 (shown in FIG. 1). The springs 224 are compressed between the ledges 400 and the optical fiber connectors 110 and provide a restoring force along the mating direction 228. The restoring force may ensure that the optical fiber connectors 110 remain in contact with or otherwise mated with the optical communication device 500 (shown in FIG. 5).

In the illustrated embodiment, the connector base 218 includes several flat surfaces 406, 408, 410 along the exterior surface of the connector base 218. For example, the connector base 218 may have an approximately cylindrical shape with one or more flat surfaces 406-410 cut into the connector base 218. The flat surfaces 406-410 may engage the connector housing 208 (shown in FIG. 2) to prevent the connector base 218 from rotating relative to the connector housing 208. For example, a corresponding flat surface or ledge (not shown) of the connector housing 208 may engage one or more of the flat surfaces 406-410 to prevent the connector base 218 from rotating.

Figure 6:
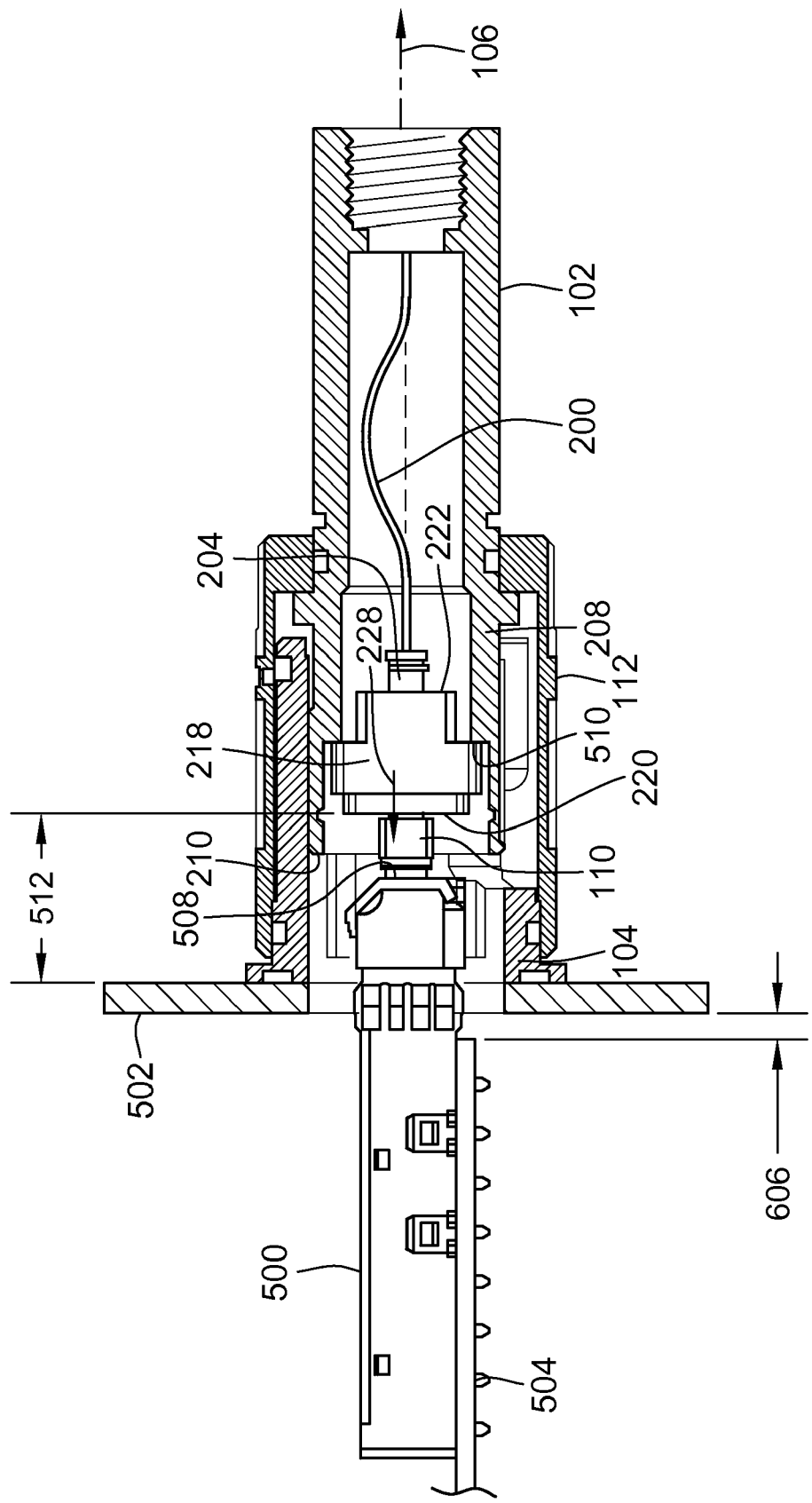
FIG. 6 is another partial cross-sectional view of the fiber optic connector assembly and the mating connector assembly in accordance with one embodiment.

FIG. 5 is a partial cross-sectional view of the fiber optic connector assembly 102 and the mating connector assembly 104 in a mated relationship in accordance with one embodiment. FIG. 6 is another partial cross-sectional view of the fiber optic connector assembly 102 and the mating connector assembly 104 in a mated relationship in accordance with one embodiment. FIGS. 5 and 6 illustrate the ability of the optical fiber connectors 110 to axially float along the center axis 106 in order to compensate for various positions of the optical communication device 500 of the mating connector assembly 104 relative to the panel 502. As shown in FIGS. 5 and 6, the mating connector assembly 104 is mounted to the panel 502 and the optical communication device 500 is mounted to a substrate 504, such as a circuit board. The panel 502 and substrate 504 are separated by a separation dimension that may vary among devices that include the panel 502 and the mating connector assembly 104. For example, in FIG. 5, the substrate 504 is separated from the panel 502 by a separation dimension 506. In FIG. 6, the substrate 504 is separated from the panel 502 by a smaller separation dimension 606. The separation dimension 506, 606 may determine the location of the optical communication device 500 relative to the panel 502 and the mating connector assembly 104. Additionally, the location of the optical communication device 500 on the substrate 504 may determine the location of the optical communication device 500 relative to the panel 502 and the mating connector assembly 104.

As shown in FIGS. 5 and 6, the connector base 218 is secured to the mating end 210 of the connector housing 208. The connector housing 208 includes internal ledges 510 that engage the connector base 218 and prevent the connector base 218 from moving along the center axis 106 and away from the mating connector assembly 104 past the internal ledges 510 when the connector housing 208 is received in the mating connector assembly 104. A separation dimension 512 extends along the center axis 106 between the forward end 220 of the connector base 218 and the exterior surface of the panel 502 when the fiber optic connector assembly 102 and mating connector assembly 104 are mated. As shown in FIGS. 5 and 6, the separation dimension 512 may remain approximately constant regardless of the position of the optical communication device 500 with respect to the panel 502.

As the location of the optical communication device 500 relative to the panel 502 and the mating connector assembly 104 may vary among different devices, the location of the mating surface 508 of the optical communication device 500 also may vary relative to the panel 502 and the mating connector assembly 104. For example, the mating surface 508 extends farther away from the panel 502 in the mating connector assembly 104 in the embodiment shown in FIG. 6 than in the embodiment shown in FIG. 5. When the fiber optic connector assembly 102 mates with the mating connector assembly 104, the coupling interface component 112 of the fiber optic connector assembly 102 engages the mating connector assembly 104. This engagement may advance the optical fiber connectors 110 toward the mating surface 508 of the optical communication device 500 by the coupling distance 122 (shown in FIG. 1) along the center axis 106. As the separation dimension 512 between the connector base 218 and the panel 502 may remain approximately the same but the location of the mating surface 508 may vary, the engagement between the coupling interface component 112 and the mating connector assembly 104 may move the optical fiber connectors 110 too far toward the mating surface 508 and compress the outer ends 202 (shown in FIG. 2) against the mating surface 508. Overdriving the optical fiber connectors 110 in such a manner may result in damage to the optical fibers 200.

In order to prevent damage to the outer ends 202, the optical fiber connectors 110 axially float relative to the connector housing 208. As described above, the posts 204 slide within the connector base 218 and along the center axis 106, thereby permitting the optical fiber connectors 110 to move along the center axis 106. The optical fiber connectors 110 are able to retreat away from the mating surface 508 when the mating surface 508 extends farther into the mating connector assembly 104 away from the panel 502. For example, as shown in FIG. 6, when the mating surface 508 is located in one mating connector assembly 104 in a position that is farther from the panel 502 than another mating connector assembly 104, the posts 204 slide along the center axis 106 and partially extend out of the rearward end 222 of the connector base 218. As the posts 204 slide within the connector base 218, the optical fiber connectors 110 move away from the panel 502. The optical fiber connectors 110 may slide away from the panel 502 by the floating distance 306. By way of example only, in one embodiment, the floating distance 306 is at least approximately 1.0 millimeter. Alternatively, the floating distance 306 is at least approximately 2.0 millimeters. Other floating distances 306 may be within the scope of one or more embodiments described herein.

The floating distance 306 provides increased dimensional tolerance in mating the outer ends 202 (shown in FIG. 2) of the optical fibers 200 with the mating surface 508. For example, instead of the location of the outer ends 202 being fixed relative to one or more other components of the fiber optic connector assembly 102, the ability of the optical fiber connectors 110 to float along the center axis 106 permits the outer ends 202 to engage the mating surface 508 over an increased range of separation dimensions 506, 606 between the substrate 504 and the panel 502 and/or over an increased range of positions of the optical communication device 500 relative to the panel 502.

The optical fiber connectors 110 move along the center axis 106 relative to the connector housing 208 while the connector housing 208 remains in approximately the same position relative to the mating connector assembly 104 and the panel 502 in the illustrated embodiment. The optical fiber connectors 110 may axially float along the center axis 106 relative to one or more other components of the system 100 (shown in FIG. 1). For example, the optical fiber connectors 110 may move along the center axis 106 relative to the coupling interface component 112. As the optical fiber connectors 110 move away from the panel 502, the springs 224 are compressed between the connector base 218 and the optical fiber connectors 110 to impart a restoring force on the optical fiber connectors 110 in the mating direction 228. The restoring force ensures that the outer ends 202 (shown in FIG. 2) of the optical fibers 200 remain in contact with or otherwise engaged with the mating surface 508 of the optical communication device 500 to optically communicate signals therebetween.

Figure 7:
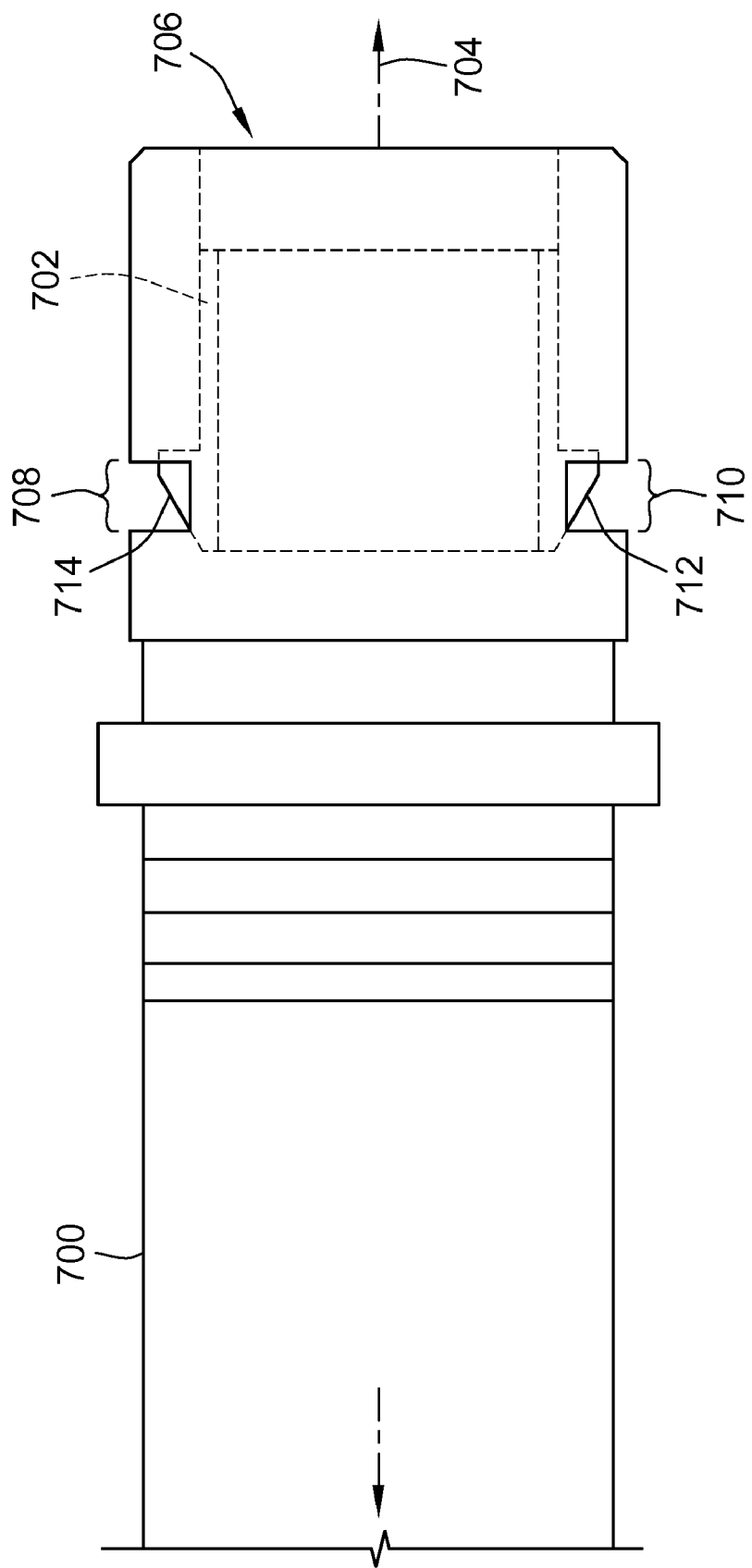
FIG. 7 illustrates a perspective view of a connector housing and a connector base in accordance with another embodiment.

FIG. 7 illustrates a perspective view of a connector housing 700 and a connector base 702 in accordance with another embodiment. The connector housing 700 is shown in phantom view to more clearly show the connector base 702 inside the connector housing 700. The connector housing 700 may be similar to the connector housing 208 (shown in FIG. 2) and the connector base 702 may be similar to the connector base 218 (shown in FIG. 2). For example, the connector housing 700 may be received in the mating connector assembly 104 (shown in FIG. 1) to mate the fiber optic connector assembly 102 (shown in FIG. 1) with the mating connector assembly 104. The connector base 218 may hold the posts 204 (shown in FIG. 2) of the optical fiber connectors 110 (shown in FIG. 1) to permit the optical fiber connectors 110 to axially move along a center axis 704.

The connector housing 700 is elongated along the center axis 704 and defines an interior passage 706 that is similar to the passage 214 (shown in FIG. 2). Slots 708, 710 are located on opposite sides of the connector housing 700 and extend into the passage 706. Alternatively, the slots 708, 710 may be located elsewhere on the connector housing 700. The connector base 702 includes latches 712, 714 that radially extend from opposite sides of the connector base 702. Alternatively, the latches 712, 714 may be located elsewhere on the connector base 702. The latches 712, 714 are received in the slots 708, 710 to secure the connector base 702 to the connector housing 700. For example, the connector base 702 may be loaded into the passage 706 until the latches 712, 714 protrude into and are received by the slots 708, 710. The engagement between the latches 712, 714 and the slots 708, 710 may prevent the connector base 702 from moving relative to the connector housing 700. For example, the latches 712, 714 may engage the slots 708, 710 to prevent the connector base 702 from axially moving along the center axis 704 and/or rotating relative to the connector housing 700.

Figure 8:
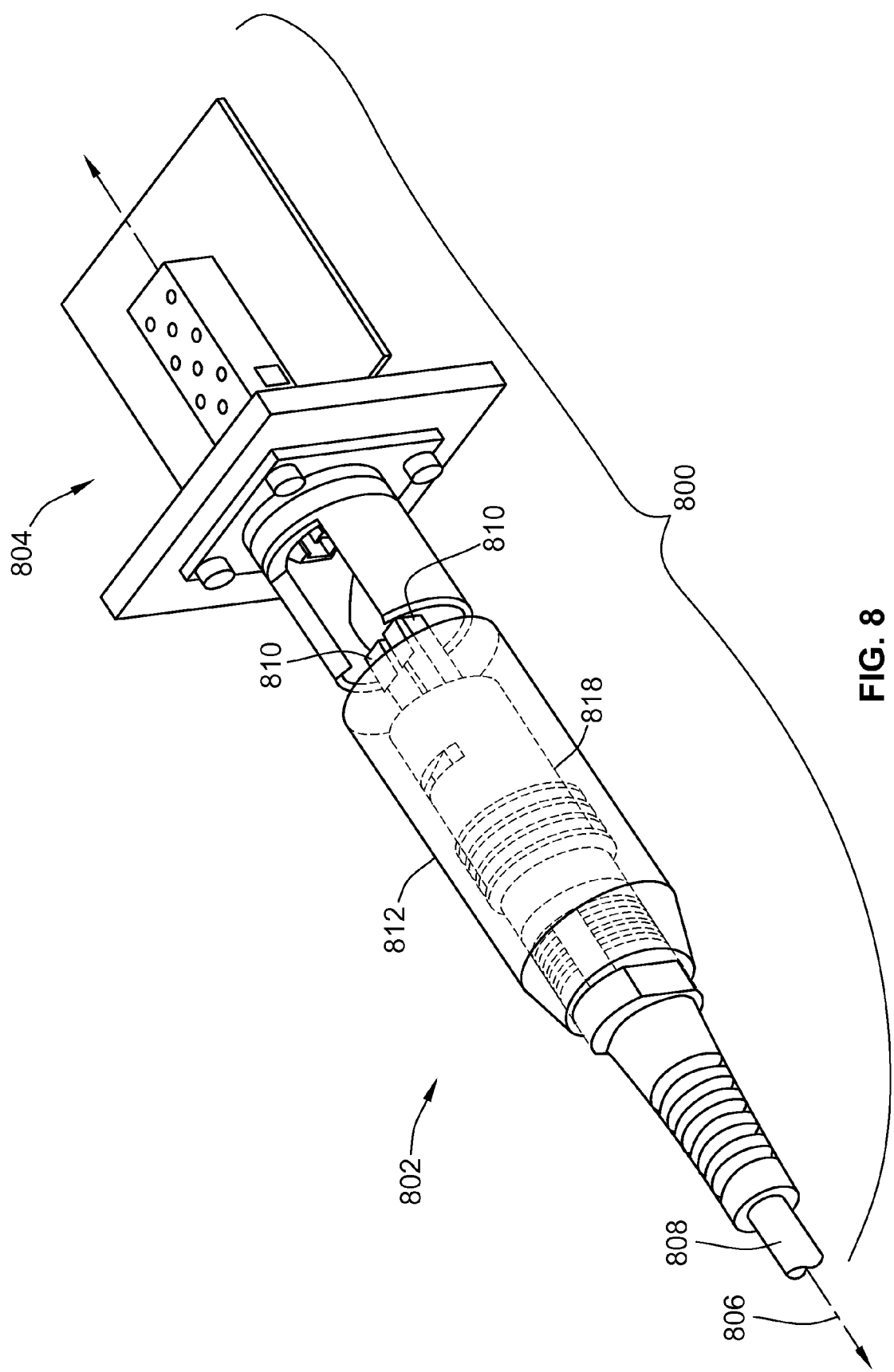
FIG. 8 is a perspective view of a fiber optic connector system in accordance with another embodiment of the present disclosure.

FIG. 8 is a perspective view of a fiber optic connector system 800 in accordance with another embodiment of the present disclosure. Similar to the connector system 100 shown in FIG. 1, the connector system 800 includes a fiber optic connector assembly 802 and a mating connector assembly 804. The mating connector assembly 804 may be similar to the mating connector assembly 104 (shown in FIG. 1). The mating connector assembly 804 is shown partially cut away in FIG. 8. The connector assembly 802 is elongated and oriented along a center axis 806. The connector assembly 802 includes a cable 808 that houses one or more elongated optical fibers 908 (shown in FIG. 9). The cable 808 and optical fibers 908 extend along the center axis 806. The optical fibers 908 are coupled with one or more optical fiber connectors 810 that may be similar to the connectors 110 (shown in FIG. 1). The optical fiber connectors 810 may be received in the mating connector assembly 804 to optically couple the connector assemblies 802, 804.

The connector assembly 802 includes a coupling interface component 812 that extends around the center axis 806 along a portion of the length of the fiber optic connector assembly 802. The coupling interface component 812 is shown in phantom view, or as being translucent, in FIG. 8. A connector housing 818 is disposed within the coupling interface component 812. The connector housing 818 may be similar to the connector housing 208 (shown in FIG. 2) in that the connector housing 818 mates with the mating connector assembly 804.

For example, the connector housing 818 may be received in the mating connector assembly 804 to couple the connector assemblies 802, 802.

The coupling interface component 812 sequentially engages both the mating connector assembly 804 and the connector housing 818 to secure the connector housing 818 to the mating connector assembly 804 and prevent movement of the connector housing 818 relative to the mating connector assembly 804 in opposite directions along the center axis 806. For example, prior to the coupling interface component 812 engaging either the mating connector assembly 804 or the connector housing 818, the connector housing 818 may axially move within and relative to the coupling interface component 812. The coupling interface component 812 may lock onto the mating connector assembly 804 prior to engaging the connector housing 818 to secure the coupling interface component 812 to the mating connector assembly 804. Locking the coupling interface component 812 to the mating connector assembly 804 prior to engaging the connector housing 818 prevents movement of the coupling interface component 812 relative to the mating connector assembly 804 while permits the connector housing 818 to axially move within the coupling interface component 812 relative to the mating connector assembly 804 and the coupling interface component 812. The connector housing 818 may continue to move relative to the mating connector assembly 804 and the coupling interface component 812 in order to mate the optical fiber connectors 810 with the mating connector assembly 804. For example, the connector housing 818 may axially float along the center axis 806 to engage the optical fiber connectors 810 with the mating connector assembly 804.

The coupling interface component 812 may then engage the connector housing 818 to prevent further movement of the connector housing 818. By way of example only, the coupling interface component 812 may be rotated about the center axis 806 by a quarter turn relative to the connector housing 818 to lock the coupling interface component 812 onto the connector housing 818. The engagement of the coupling interface component 812 with the connector housing 818 prevents movement of the connector housing 818 along the center axis 806 relative to the coupling interface component 812 and the mating connector assembly 804.

In one embodiment, the connector assembly 802 includes a connector base 900 (shown in FIG. 9) that permits the optical fiber connectors 810 to axially float along the center axis 806 after the coupling interface component 812 is locked onto the connector housing 818 and the mating connector assembly 804. For example, the connector assembly 802 may include a connector base 900 that is similar to the connector base 218 (shown in FIG. 2). The connector base 900 permits the optical fiber connectors 810 to move toward and/or away from the mating connector assembly 804 to mate outer ends 914 (shown in FIG. 9) of the optical fiber 908 (shown in FIG. 9) with the mating connector assembly 804, similar to as described above.

Figure 9:
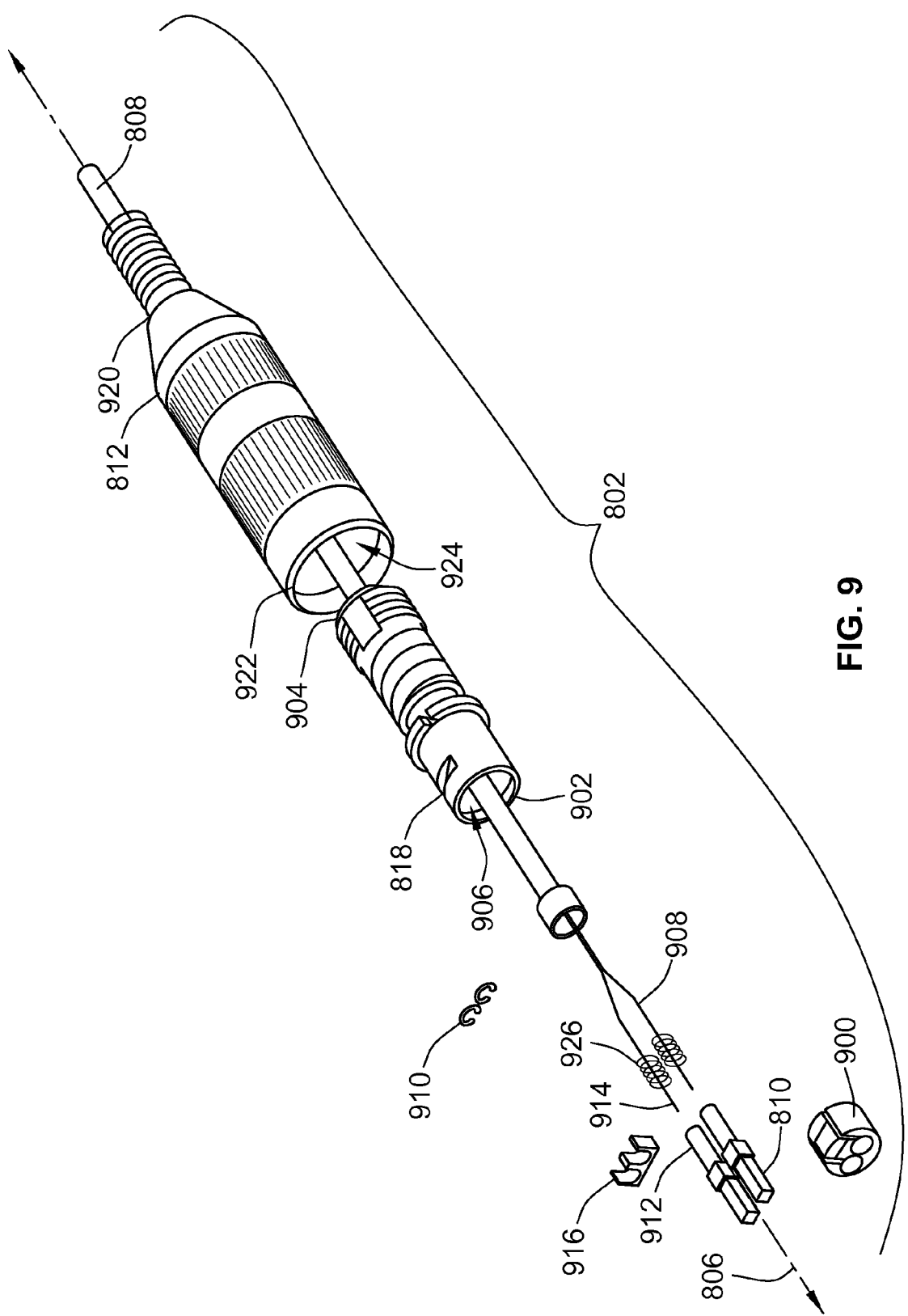
FIG. 9 is an exploded view of a fiber optic connector assembly shown in FIG. 8 in accordance with one embodiment of the present disclosure.

FIG. 9 is an exploded view of the fiber optic connector assembly 802 in accordance with one embodiment of the present disclosure. The connector housing 818 extends from a mating end 902 to a cable receiving end 904 along the center axis 806. The mating end 902 may be received in the mating connector assembly 804. The cable receiving end 904 is coupled with the cable 808. The connector housing 818 includes a central passage 906 that extends through the connector housing 818. The cable 808 and/or the optical fibers 908 disposed within the cable 808 may pass through the connector housing 818 via the central passage 906. As shown in FIG. 9, the optical fibers 908 extend through the cable 808 to the outer ends 914. Each of the outer ends 914 may be disposed within a different optical fiber connector 810. Alternatively, more than one optical fiber 908 may extend to outer ends 914 located in a single optical fiber connector 810.

The connector base 900 is coupled with the connector housing 818 at or near the mating end 902 of the connector housing 818. In the illustrated embodiment, the connector base 900 is similar to the connector base 218 (shown in FIG. 2). As described above, the optical fiber connectors 810 are slidably joined with the connector base 900 such that the optical fiber connectors 810 slide relative to the connector base 900 to axially move along the center axis 806. The connector assembly 802 includes retaining clips 910 that may be similar to the retaining clips 226 (shown in FIG. 2), posts 912 coupled with the optical fiber connectors 810 and that are similar to the posts 204 (shown in FIG. 2), springs 926 that are similar to the springs 224 (shown in FIG. 2), and a duplex clip 916 that is joined with the optical fiber connectors 810 and may be similar to the duplex clip 206 (shown in FIG. 2).

The coupling interface component 812 extends along the center axis 806 from a back end 920 to a coupling end 922. The back end 920 receives the cable 808. The back end 920 may engage the connector housing 818 to join the coupling interface component 812 to the connector housing 818 and prevent movement of the connector housing 818 relative to the coupling interface component 812. For example, the back end 920 may lock onto the connector housing 818 at or near the cable receiving end 904. The coupling end 922 engages the mating connector assembly 804 (shown in FIG. 8) to connect the coupling interface component 812 with the mating connector assembly 804. The coupling end 922 may include a bayonet-style coupling nut similar to the coupling interface component 112 (shown in FIG. 1). Alternatively, the coupling end 922 may have an internal threaded surface that engages an external threaded surface (not shown) of the mating connector assembly 804. In another embodiment, the coupling end 922 may include a push/pull connector that engages and disengages the mating connector assembly 804 by pushing and/or pulling the coupling interface component 812 in directions along the center axis 806.

The coupling interface component 812 defines an interior chamber 924 disposed between the back end 920 and the coupling end 922. The interior chamber 924 has dimensions large enough to receive the connector housing 818. As shown in FIG. 8, the connector housing 818 is disposed within the coupling interface component 812.

Figure 10:
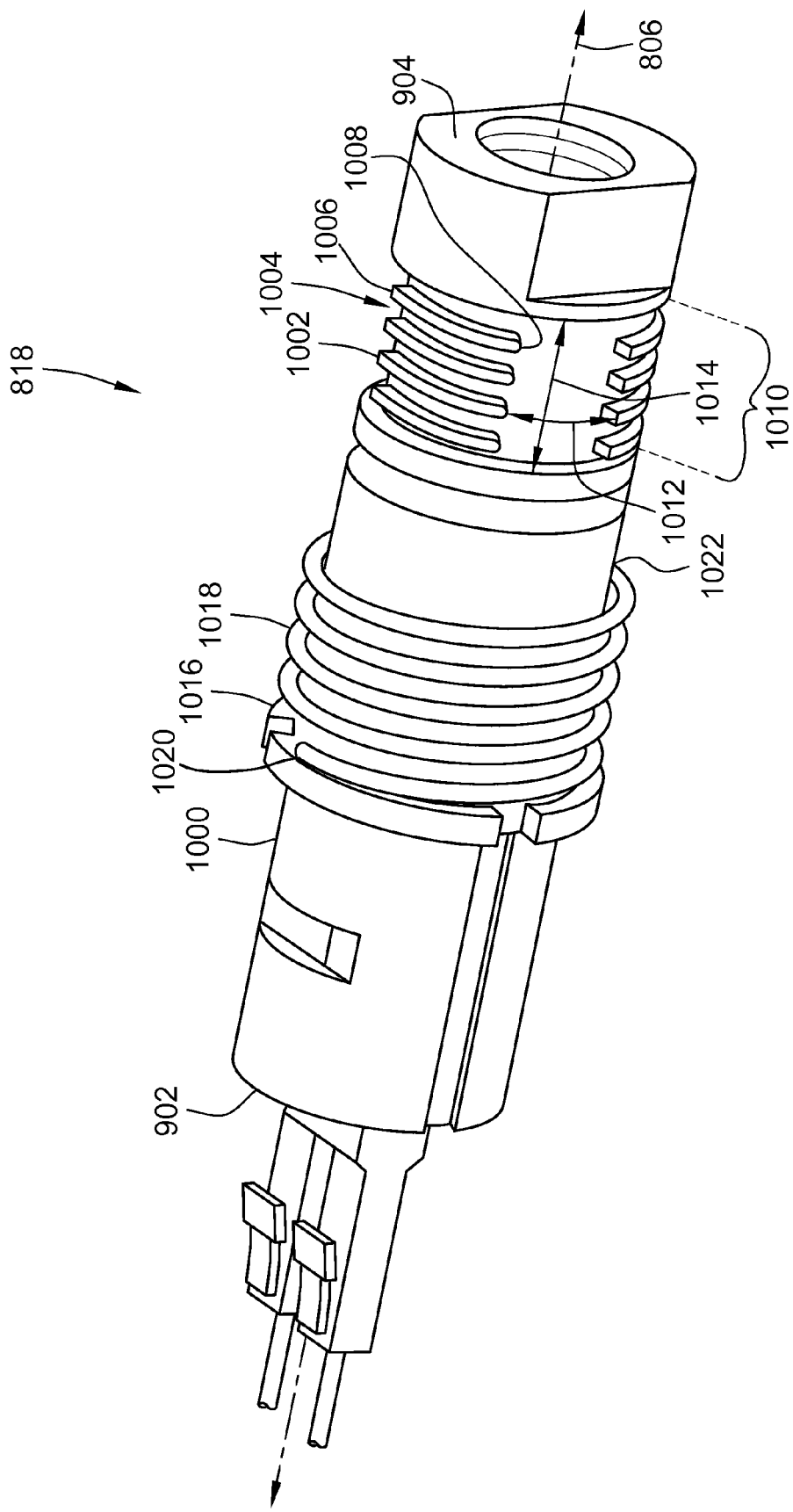
FIG. 10 is a perspective view of a connector housing shown in FIG. 8 in accordance with one embodiment of the present disclosure.

FIG. 10 is a perspective view of the connector housing 818 in accordance with one embodiment of the present disclosure. The connector housing 818 has an elongated, approximately tubular body 1000 that extends between the cable receiving end 904 and the mating end 902. The body 1000 includes several ridges 1002 that circumferentially extend around the exterior surface of the body 1000 in the illustrated embodiment. The ridges 1002 are elongated walls that radially protrude from the exterior surface of the body 1000. As shown in FIG. 10, the ridges 1002 extend arcuately between opposite ends 1006, 1008. For example, the ridges 1002 may not extend entirely around the circumference of the body 1000 and may terminate at the ends 1006, 1008. The ridges 1002 define slots 1004 located between two ridges 1002 that are consecutive with one another along the length of the body 1000 in a direction parallel to the center axis 806. Alternatively, the slots 1004 may extend into the exterior surface of the body 1000. For example, instead of the ridges 1002 defining the slots 1004, the slots 1004 may be formed by cutting or molding grooves into the body 1000.

The ridges 1002 are arranged in multiple sets 1010 around the circumference of the body 1000. In the illustrated embodiment, each set 1010 includes four consecutive ridges 1002 separated from one another by the slots 1004 along a portion of the length of the body 1000. Alternatively, the sets 1010 may include a different number of ridges 1002 and/or slots 1004. The ridges 1002 are axially spaced apart such that each ridge 1002 in each set 1010 is disposed a different distance from the mating end 902 and the cable receiving end 904 than the other ridges 1002 in the set 1010. The sets 1010 are circumferentially spaced apart by an advancement gap 1012. The advancement gap 1012 arcuately extends between the ridges 1002 in adjacent sets 1010 and axially extends along the length of the body 1000 between the ridges 1002. For example, the advancement gap 1012 may extend arcuately along the outer surface of the body 1000 from the ends 1008 of the ridges 1002 in one set 1010 to the ends 1006 of the ridges 1002 in another set 1010. The advancement gap 1012 also may extend axially along a length dimension 1014. The length dimension 1014 represents a portion of the length of the body 1000 that is encompassed by the sets 1010.

The body 1000 includes a flange or ledge 1016 that circumferentially extends around the body 1000 and is disposed between the mating end 902 and the cable receiving end 904. In the illustrated embodiment, the ledge 1016 is located between the mating end 902 and the sets 1010 of ridges 1002 and slots 1004. The ledge 1016 includes a radially protruding extension of the body 1000. The ledge 1016 may extend around the entire circumference of the body 1000 or around a portion of the entire circumference. Alternatively, a protrusion other than a ledge 1016 may extend from the body 1000. For example, a ridge, pin, arm, and the like, may radially extend from the outer surface of the body 1000.

A spring 1018 is disposed on the body 1000 between the ledge 1016 and the cable receiving end 904. In the illustrated embodiment, the spring 1018 is located between the ledge 1016 and the sets 1010 of ridges 1002 and slots 1004. The spring 1018 extends between opposite ends 1020, 1022 and helically surrounds the body 1000. One of the ends 1020 abuts the ledge 1016 while the other end 1022 is spaced from the ledge 1016 and is arranged for engagement by a portion of the coupling interface component 812 as will be described below. The spring 1018 engages the ledge 1016 and is prevented from moving toward the mating end 902 by the ledge 1016. For example, the spring 1018 may have an inside diameter dimension that is greater than an outside diameter dimension of the body 1000 between the ledge 1016 and the sets 1010 of ridges 1002 and slots 1004, but that is smaller than an outside diameter dimension of the ledge 1016.

Figure 11:
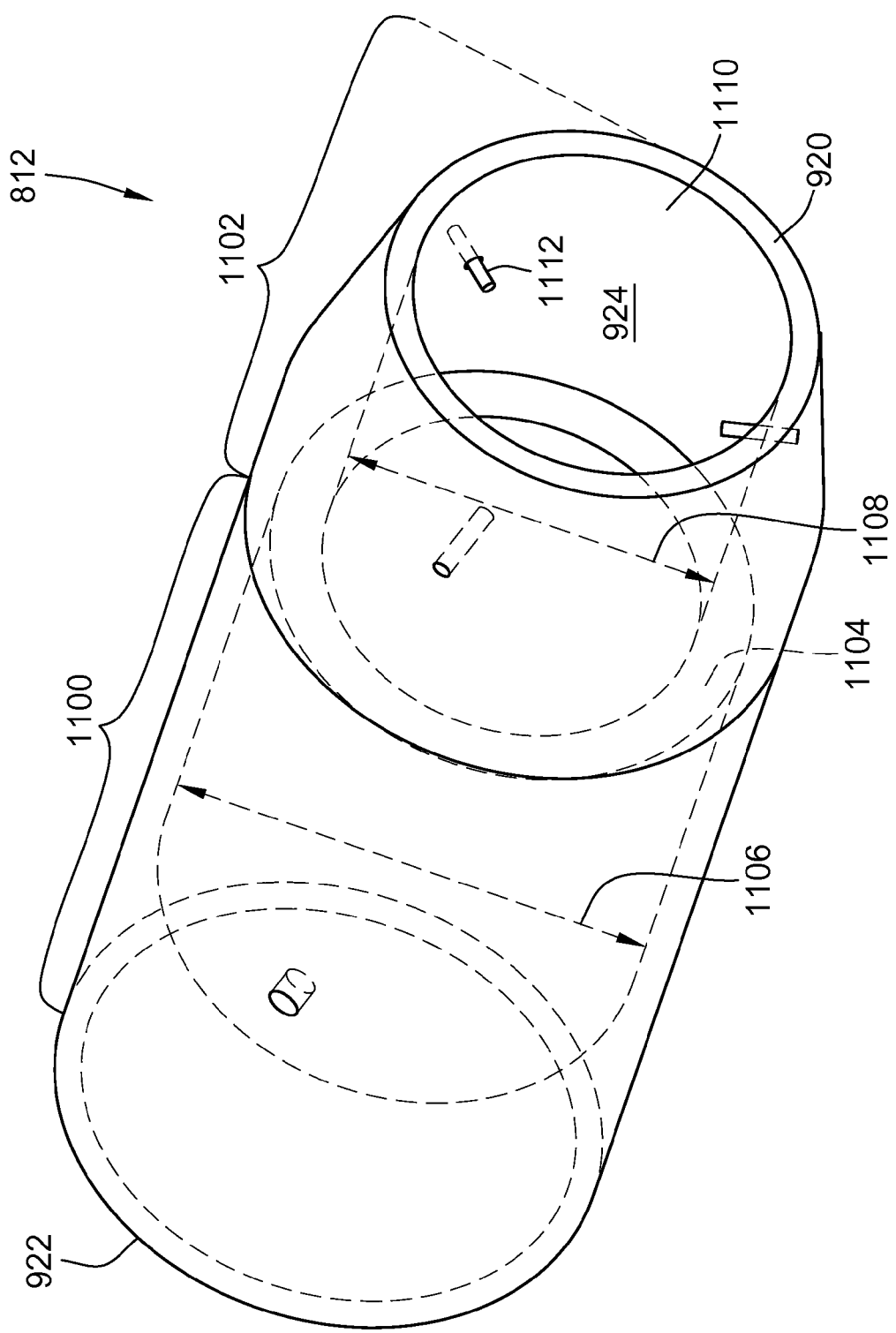
FIG. 11 is a perspective view of a coupling interface component shown in FIG. 8 in accordance with one embodiment of the present disclosure.

FIG. 11 is a perspective view of the coupling interface component 812 in accordance with one embodiment of the present disclosure. The coupling interface component 812 is shown in phantom view in FIG. 11 such that the component 812 appears translucent. The interior chamber 924 of the coupling interface component 812 is defined by an interior surface 1110 that extends through the component 812 between the coupling end 922 and the back end 920. The interior surface 1110 may be stepped in diameter to form several stages 1100, 1102. While two stages 1100, 1102 are shown, alternatively a different number of stages 1100, 1102 may be provided. An internal shoulder 1104 is located at the interface between the stages 1100, 1102. For example, the stage 1100 extends from the coupling end 922 of the component 812 to the internal shoulder 1104 and the stage 1102 extends from the back end 920 to the internal shoulder 1104. An inside diameter dimension 1106 of the stage 1100 is greater than an inside diameter dimension 1108 of the stage 1102.

The shoulder 1104 provides an engagement surface that is configured to engage the end 1022 of the spring 1018 (shown in FIG. 10). For example, the end 1020 of the spring 1018 abuts the ledge 1016 (shown in FIG. 10) of the connector housing 818 (shown in FIG. 8) while the opposite end 1022 engages the shoulder 1104. The spring 1018 may be compressed between the ledge 1016 and the shoulder 1104 when the connector assembly 802 (shown in FIG. 8) mates with the mating connector assembly 804 (shown in FIG. 8). For example, the coupling interface component 812 may mate with the mating connector assembly 804. The spring 1018 applies a mating force on the connector housing 818 along the center axis 806 (shown in FIG. 8) and toward the mating connector assembly 804. The spring 1018 may provide the mating force if the joining of the coupling interface component 812 to the mating connector assembly 804 causes the connector housing 818 to engage the mating connector assembly 804 and compress the spring 1018 between the shoulder 1104 and ledge 1016.

In one embodiment, the mating force ensures that the connector housing 818 (shown in FIG. 8) remains mated with the mating connector assembly 804 (shown in FIG. 8) when the cable 808 (shown in FIG. 8) is pulled along the center axis 806 (shown in FIG. 8) and away from the mating connector assembly 804. For example, an operator may pull on the cable 808 in a direction away from the mating connector assembly 804. Pulling on the cable 808 may cause the connector housing 818 to retreat from the mating connector assembly 804 along the center axis 806. This rearward movement of the connector housing 818 can compress the spring 1018 (shown in FIG. 10) between the coupling interface component 812 and the connector housing 818. The compression of the spring 1018 causes the spring 1018 to provide a restoring force on the connector housing 818 in an opposite direction, such as toward the mating connector assembly 804. As a result, the spring 1018 may push the connector housing 818 back into a mated relationship with the mating connector assembly 804 once the operator stops pulling on the cable 808.

The coupling interface component 812 includes protrusions 1112 that inwardly extend from the interior surface 1110. In the illustrated embodiment, the protrusions 1112 are pins but alternatively may be ridges, plates, nubs, fingers, latches, and the like. While three protrusions 1112 are shown in FIG. 11, a different number of protrusions 1112 may be provided. The protrusions 1112 engage the ridges 1002 (shown in FIG. 10) of the connector housing 818 (shown in FIG. 8) to couple the component 812 with the housing 818. For example, the protrusions 1112 may be received in slots 1004 (shown in FIG. 10) located between consecutive ridges 1002. Engagement of the protrusions 1112 and the ridges 1002 locks the component 812 to the housing 818 and may prevent movement along the center axis 806 (shown in FIG. 8) of the housing 818 relative to the component 812. Alternatively, the protrusions 1112 may outwardly extend from the connector housing 818 while the ridges 1002 and/or slots 1004 are disposed on the coupling interface component 812.

During mating of the connector assemblies 802, 804 (shown in FIG. 8), the coupling end 922 of the coupling interface component 812 may be joined to the mating connector assembly 804. For example, the coupling end 922 may include a bayonet-type or threaded-type connection that mates with the mating connector assembly 804 to define a first fixed interface between the connector assemblies 802, 804.

The spring 1018 (shown in FIG. 10) may provide additional axial float to the optical fiber connectors 810 (shown in FIG. 8). For example, during mating of the connector assemblies 802, 804 (shown in FIG. 8), the spring 1018 may be compressed between the connector housing 818 (shown in FIG. 8) and the coupling interface component 812 (shown in FIG. 8). For example, the spring 1018 may be compressed between the ledge 1016 (shown in FIG. 10) of the connector housing 818 and the shoulder 1104 of the coupling interface component 812. The compression of the spring 1018 may be caused by the connector housing 818 engaging the mating connector assembly 804 while the coupling interface component 812 continues to move forward toward the mating connector assembly 804 along the center axis 806 (shown in FIG. 8). For example, the mating end 902 (shown in FIG. 9) of the connector housing 818 may abut the mating connector assembly 804 as the connector assemblies 802, 804 mate to prevent the connector housing 818 from continuing to move along the center axis 806. The coupling interface component 812 may be further advanced along the center axis 806 toward the mating connector assembly 804 relative to the connector housing 818 as the coupling interface component 812 locks onto the mating connector assembly 804. The axial movement of the coupling interface component 812 relative to the connector housing 818 may compress the spring 1018 between the coupling interface component 812 and the connector housing 818.

The spring 1018 (shown in FIG. 10) may be compressed to provide a mating force on the optical fiber connectors 810 (shown in FIG. 8) toward the mating connector assembly 804 (shown in FIG. 8) along the center axis 806 (shown in FIG. 8). As described above, the optical fiber connectors 810 may be supported by springs 926 (shown in FIG. 9). During mating of the connector assemblies 802, 804, the springs 926 may be compressed to permit the connector base 900 (shown in FIG. 9) to be move forward relative to the optical fiber connectors 810. When the coupling interface component 812 (shown in FIG. 8) is rotated to engage the mating connector assembly 804 and the connector housing 818 (shown in FIG. 8), the potential may exist for the protrusions 1112 of the coupling interface component 812 to be aligned with one of the ridges 1002 (shown in FIG. 10) of the connector housing 818 and not with a slot 1004 (shown in FIG. 10) between the ridges 1002. For example, the protrusions 1112 may engage the ridges 1002 and prevent the coupling interface component 812 from rotating relative to the connector housing 818 to engage the coupling interface component 812 with the connector housing 818. In order to permit the protrusions 1112 to be aligned with and received into the slots 1004, the spring 1018 may be compressed between the connector housing 818 and the coupling interface component 812 to allow the connector housing 818 to continue to axially move relative to the coupling interface component 812 until the protrusions 1112 are aligned with and received into a slot 1004.

In one embodiment, the spring 1018 (shown in FIG. 10) permits the connector housing 818 (shown in FIG. 8) and the optical fiber connectors 810 (shown in FIG. 8) to move in directions parallel to the center axis 806 (shown in FIG. 8) by at least approximately 2 millimeters to 6 millimeters. Alternatively, the spring 1018 may permit a greater range of movement of the optical fiber connectors 810 along the center axis 806. The spring 1018 may compress to permit the optical fiber connectors 810 to move along the center axis 806 in order to position the outer ends 914 (shown in FIG. 9) of the optical fibers 908 (shown in FIG. 9) in an abutted relationship against a mating surface (such as the mating surface 508 shown in FIG. 5) of an optical communication device in the mating connector assembly 804 (such as the optical communication device 500 shown in FIG. 5) without leaving a significant air gap between the outer ends 914 and the mating surface and without overdriving or compressing the optical fibers 908 against the mating surface to the point at which the optical fibers 908 become damaged.

The spring 1018 (shown in FIG. 10) may permit the optical fiber connectors 810 (shown in FIG. 8) to mate with the connector assembly 804 without overdriving the ends 914 (shown in FIG. 9) of the optical fibers 908 (shown in FIG. 9). The protrusions 1112 may be aligned with the advancement gaps 1012 (shown in FIG. 10) between the sets 1010 (shown in FIG. 10) of ridges 1002 to permit the connector housing 818 to axially move relative to the component 812. For example, the connector housing 818 may axially move until the protrusions 1112 are aligned with one or more slots 1004 and are rotated into the slots 1004. The coupling interface component 812 is locked with the connector housing 818 by rotating the coupling interface component 812 relative to the connector housing 818 such that the protrusions 1112 move from the advancement gap 1014 to the slots 1004 between consecutive ridges 1002. The movement of the protrusions 1112 to between the ridges 1002 locks the coupling interface component 812 to the connector housing 818 such that the connector housing 818 cannot axially move relative to the coupling interface component 812 in opposite directions. The engagement between the back end 920 of the coupling interface component 812 and the cable receiving end 904 (shown in FIG. 9) of the connector housing 818 defines a second fixed interface between the coupling interface component 812 and the connector housing 818.

The protrusions 1112 may be placed between different pairs of consecutive ridges 1002 (shown in FIG. 10) axially spaced apart to vary the location of the optical fiber connectors 810 (shown in FIG. 8) along the center axis 806 (shown in FIG. 8). For example, placing the protrusions 1112 between the last two ridges 1002 in the sets 1010 (shown in FIG. 10) may locate the optical fiber connectors 810 farther from the mating connector assembly 804 (shown in FIG. 8) than placing the protrusions 1112 between the first two consecutive ridges 1002. In one embodiment, the length dimension 1014 (shown in FIG. 10) over which the ridges 1002 extend is related to the total axial displacement that the connector housing 818 may move relative to the coupling interface component 812. The component 812 may be rotated about the center axis 806 to move the protrusions 1112 into the slots 1004 of the sets 1010 and lock the connector housing 818 to the component 812. Once the housing 818 and component 812 are locked together, the housing 818 is prevented from axially moving relative to the component 812. The optical fiber connectors 810 (shown in FIG. 8) may still be capable of axially moving along the center axis 806 after the coupling interface component 812 is locked to the mating connector assembly 804 and the connector housing 818, as described above. The engagement between the protrusions 1112 and the ridges 1002 can safeguard the connector assemblies 802, 804 from unmating if the cable 808 is pulled away from the mating connector assembly 804.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A fiber optic connector assembly comprising:
   a coupling interface component extending along a center axis from a back end to a coupling end, the coupling interface component including an interior chamber, the coupling end configured to engage a mating connector;
   a connector housing disposed within the interior chamber of the coupling interface component, the connector housing extending along the center axis from a cable receiving end to a mating end with a passage extending therethrough, the cable receiving end configured to receive a cable having an optical fiber, the mating end configured to mate with the mating connector; and
   an optical fiber connector joined to the optical fiber and interconnected with the connector housing, the optical fiber connector configured to optically couple the optical fiber with the mating connector, wherein the coupling interface component engages the connector housing and the mating connector and prevents movement of the connector housing relative to the coupling interface component and the mating connector.

2. The connector assembly of claim 1, wherein the coupling end of the coupling interface component secures the coupling interface component to the mating connector such that the connector housing is prevented from moving in opposite directions along the center axis relative to the coupling interface component and the mating connector.

3. The connector assembly of claim 1, wherein one of the coupling interface component and the connector housing includes a protrusion and the other of the coupling interface component and the connector housing includes a slot, the coupling interface component preventing movement of the connector housing when the protrusion is received in the slot.

4. The connector assembly of claim 1, wherein one of the coupling interface component and the connector housing includes a set of ridges elongated in directions perpendicular to the center axis and the other of the coupling interface component and the connector housing includes a protrusion, the protrusion received between the ridges to lock the coupling interface component and the connector housing together.

5. The connector assembly of claim 4, wherein the set includes consecutive ridges axially spaced from one another in a direction parallel to the center axis, the protrusion received between different pairs of consecutive ridges in the set to vary a position of the optical fiber connector along the center axis.

6. The connector assembly of claim 1, wherein the coupling interface component includes an internal shoulder and the connector housing includes an outwardly protruding ledge, further comprising a spring disposed in the interior chamber between the internal shoulder and the ledge, the spring applying a mating force to the connector housing along the center axis toward the mating connector.

7. The connector assembly of claim 1, wherein the coupling interface component engages the connector housing and prevents rearward movement of the connector housing and the optical fiber connector when a decoupling force is applied to the cable along the center axis away from the mating connector.

8. The connector assembly of claim 1, further comprising a connector base secured to the mating end of the connector housing and joined to the optical fiber connector, wherein the optical fiber connector is slidably joined to the connector base such that the optical fiber connector axially moves along the center axis relative to the connector housing when the connector housing mates with the mating connector.

9. The connector assembly of claim 1, wherein the coupling interface component mates with the mating connector and the connector housing to prevent movement of the connector housing relative to the mating connector while the optical fiber connector floats along the center axis relative to the connector housing and the mating connector.

10. The connector assembly of claim 1, wherein the optical fiber connector floats along the center axis relative to a first fixed interface between the coupling interface component and the mating connector and a second fixed interface between the connector housing and the coupling interface component when the coupling interface component mates with the mating connector and the connector housing.

11. A fiber optic connector assembly comprising:
    a coupling interface component extending along a center axis between a back end to a coupling end and including an interior chamber, the coupling end configured to engage a mating connector;
    a connector housing disposed within the interior chamber of the coupling interface component, the connector housing extending along the center axis from a cable receiving end to a mating end, the mating end configured to mate with the mating connector;
    a cable secured to the cable receiving end of the connector housing, the cable including an optical fiber; and
    an optical fiber connector joined with the optical fiber and configured to mate with the mating connector to optically couple the optical fiber with the mating connector, wherein the coupling interface component engages the connector housing and the mating connector and prevents movement of the connector housing along the center axis.

12. The connector assembly of claim 11, wherein the back end of the coupling interface component engages the cable receiving end of the connector housing and prevents movement of the connector housing in opposite directions along the center axis relative to the coupling interface component.

13. The connector assembly of claim 11, wherein one of the coupling interface component and the connector housing includes a protrusion and the other of the coupling interface component and the connector housing includes a slot, the protrusion received into the slot and preventing movement of the connector housing relative to the coupling interface component.

14. The connector assembly of claim 11, wherein the coupling interface component includes an internal shoulder extending into the interior chamber and the connector housing includes an outwardly protruding ledge, further comprising a spring disposed in the interior chamber between the internal shoulder and the ledge, the spring applying a mating force to the connector housing along the center axis toward the mating connector.

15. The connector assembly of claim 11, wherein the coupling interface component engages the connector housing and prevents rearward movement of the connector housing and the optical fiber connector when a decoupling force is applied along the center axis away from the mating connector.

16. The connector assembly of claim 11, wherein the coupling interface component includes a protrusion inwardly extending into the interior chamber and the connector housing includes ridges defining a slot therebetween, the protrusion rotated into the slot and securing the coupling interface component to the connector housing.

17. The connector assembly of claim 16, wherein the ridges arcuately extend around a portion of the connector housing, the coupling interface component being rotatable relative to the connector housing to disengage the protrusion from the ridges and permit axial movement of the coupling interface component relative to the connector housing.

18. The connector assembly of claim 11, further comprising a connector base secured to the mating end of the connector housing, wherein the optical fiber connector is slidably joined to the connector base such that the optical fiber connector axially moves along the center axis relative to the connector housing when the connector housing mates with the mating connector.

19. The connector assembly of claim 11, wherein the coupling interface component mates with the mating connector and the connector housing to prevent movement of the connector housing relative to the mating connector while the optical fiber connector floats along the center axis relative to the connector housing and the mating connector.

20. The connector assembly of claim 11, wherein the optical fiber connector floats along the center axis relative to a first fixed interface between the coupling interface component and the mating connector and a second fixed interface between the connector housing and the coupling interface component when the coupling interface component mates with the mating connector and the connector housing.

* * * * *